(No Model.)
J. O'CONNOR.
MACHINE FOR CATCHING STAR FISH.
No. 436,541. Patented Sept. 16, 1890.
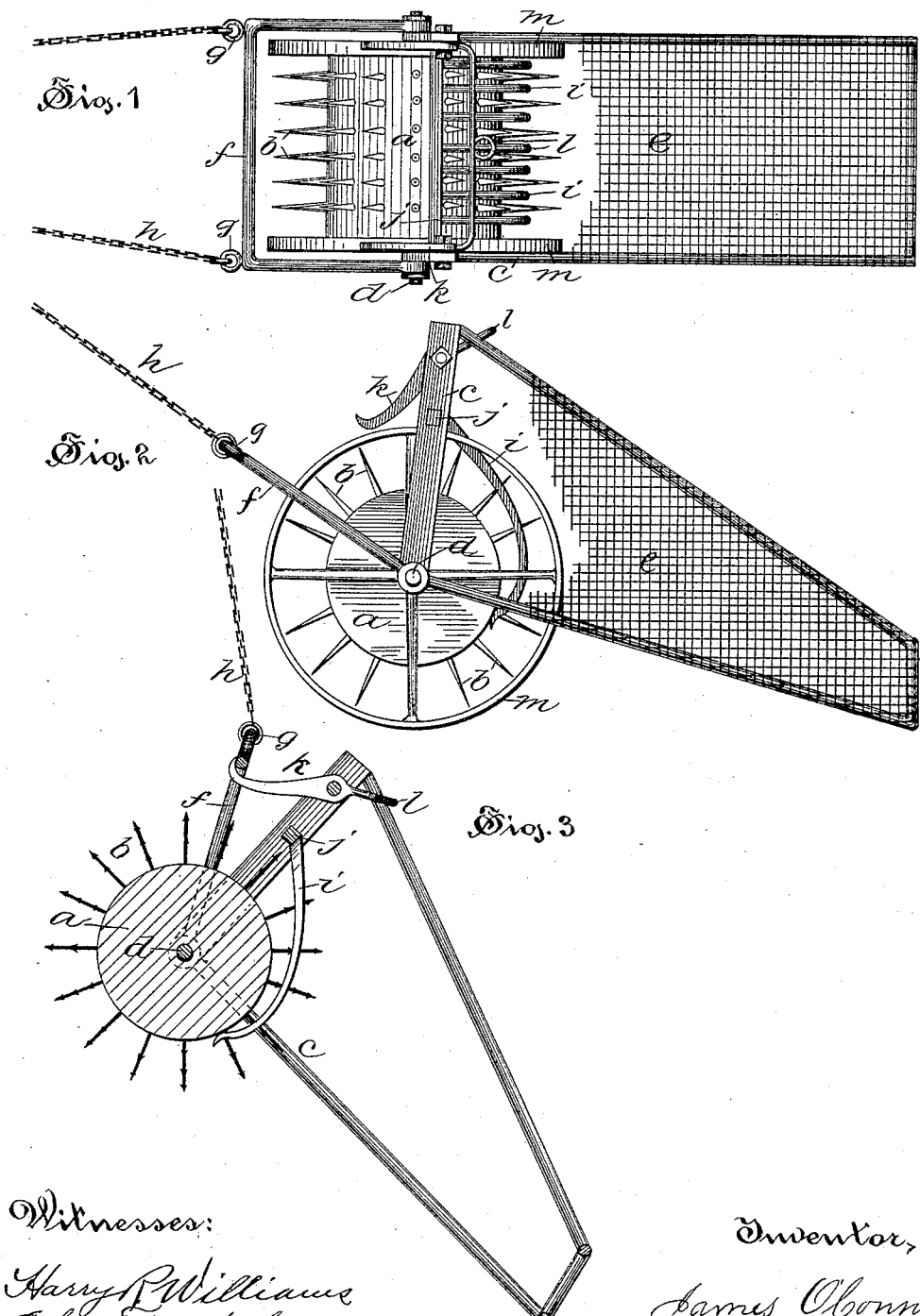

UNITED STATES PATENT OFFICE.

JAMES O'CONNOR, OF NEW HAVEN, CONNECTICUT, ASSIGNOR OF ONE-HALF TO JAMES REYNOLDS, OF SAME PLACE.

MACHINE FOR CATCHING STAR-FISH.

SPECIFICATION forming part of Letters Patent No. 436,541, dated September 16, 1890.

Application filed August 22, 1889. Serial No. 321,675. (No model.)

*To all whom it may concern:*

Be it known that I, JAMES O'CONNOR, of New Haven, in the county of New Haven and State of Connecticut, have invented certain new and useful Improvements in Machines for Catching Star-Fish, of which the following is a specification.

The invention relates to the class of machines adapted to be drawn over the bottom of the sea to destroy star-fish and similar animals which subsist on shell-fish, and the object is to provide a simple, cheap, and efficient machine that can be conveniently lowered to and drawn along the sea-bottom to pick up and deposit in a cage or bag the desired animals so that they may be destroyed.

Referring to the accompanying drawings, Figure 1 is a top view of the machine, part of the netting being removed. Fig. 2 is a side view showing the position of the parts when the device is being drawn forward. Fig. 3 is a sectional view showing the position of the parts when the device is being lowered; also showing a modified form of tooth.

The letter $a$ denotes a draft-cylinder, the periphery of which is provided with a number of rows of radially-projecting pointed or barbed teeth $b$. A metallic frame $c$ is connected on each side to a draft-axle $d$, on which said cylinder is mounted, and around this frame a netting of wire or any suitable material is drawn, forming a cage or bag $e$ open on the end adjacent to the teeth $b$. Projecting backward and downward toward the cage from a bar $j$, that passes between the uprights of the frame above the points of the teeth, are a number of ejector-arms $i$, which preferably are so curved that their lower ends lie against the cylinder between each row of teeth, so that anything pierced by the teeth and brought up as the cylinder revolves is forced off by these arms. It is desirable that the draw bar or bail should be pivoted to the axle, so it may pull at various angles and allow the device to ride evenly over the rough sea-bottom. It is also necessary that the device should land on the bottom correctly so that it will work properly. To accomplish these results a draw bar or bail $f$ is pivoted to the ends of the axle and provided with eyes $g$, to which the ends of the draw rope or chain $h$ may be fastened. In order to hold the machine in position, so that when being lowered the cage will strike bottom first and land the toothed cylinder the proper side up, a pair of hooks $k$ are pivoted to the upright side pieces of the frame near their upper end, which hooks are adapted to catch and hold the cross-bar of the bail when the machine is suspended, so that the cage hangs down at an angle of about forty-five degrees below the cylinder, but the hooks release the bail as soon as the machine strikes bottom and the weight is relieved. These hooks are preferably joined by a handle $l$, so as to operate simultaneously. The ends of the cylinder may be provided with wheels $m$ or flanges that project about the same distance as the teeth, to prevent the teeth from sticking too far into a soft bottom; also to protect the teeth from injury or the side of a boat from being damaged by the teeth when the device is being raised or lowered. When the device is being drawn over an oyster-bed, the entire weight of the machine rests upon the draft-cylinder, the teeth of which are in contact with the sea-bottom, so that, like ordinary wheels, the rear side moves upwardly while its front side moves downwardly, and the teeth will pierce soft animals, as star-fish, which they may strike, and retain them as the cylinder revolves until they are forced off by the ejector-arms into the cage, from which they are removed when the machine is brought to the surface.

I hereby disclaim a machine for catching star-fish, which consists of a revolving cylinder having radially-projecting teeth thereon, a cage, and means for disengaging the star-fish from said teeth and projecting them into the cage.

I claim as my invention—

1. A machine for catching star-fish, which consists of a revolving draft-cylinder provided with projecting teeth, the ends of the cylinder bearing flanges projecting from said cylinder a distance equal to that of said teeth to protect the points of the teeth, and a cage connected to the cylinder, substantially as specified.

2. A machine for catching star-fish, which consists of a revolving cylinder provided with projecting teeth, a frame bearing a cage connected to the axle of the cylinder, a draw-bar, and hooks pivoted to the frame and adapted to engage the draw-bar, substantially as specified.

3. A machine for catching star-fish, which consists of a revolving draft-cylinder provided with rows of radial teeth, and a frame bearing a cage connected to the draft-axle of the cylinder, also arms which project from the frame, to which they are secured by one end to a point above the axle, with their other end extending downwardly to the surface of the cylinder between the teeth adjacent to the mouth of the cage, substantially as specified.

JAMES O'CONNOR.

Witnesses:
JAMES P. PIGOTT,
BURTON MANSFIELD.